April 5, 1960   F. FRUENGEL   2,931,947
METHOD AND DEVICE FOR ELECTRICALLY STERILIZING
AND CLEANING MILKING MACHINES OR THE LIKE
Filed May 21, 1957   2 Sheets-Sheet 1

INVENTOR.
FRANK FRUENGEL
BY WILLIAM H. KUNER

April 5, 1960 F. FRUENGEL 2,931,947
METHOD AND DEVICE FOR ELECTRICALLY STERILIZING
AND CLEANING MILKING MACHINES OR THE LIKE
Filed May 21, 1957 2 Sheets-Sheet 2

INVENTOR.
FRANK FRUENGEL
BY William H. Kuner

United States Patent Office 2,931,947
Patented Apr. 5, 1960

2,931,947

METHOD AND DEVICE FOR ELECTRICALLY STERILIZING AND CLEANING MILKING MACHINES OR THE LIKE

Frank Fruengel, Hamburg-Rissen, Germany

Application May 21, 1957, Serial No. 660,675

Claims priority, application Germany January 14, 1957

18 Claims. (Cl. 315—111)

The present invention relates to means for cleaning and sterilizing and is particularly concerned with new and useful electrical devices for that purpose, specifically for sterilizing and cleaning milking machines.

In the pertinent art as presently known it is very difficult to remove milk residues which remain in the various elements of a milking machine after the milking procedure. Even water at higher temperatures to which dairy cleanser has been added will not clean completely particularly the rubber or plastic material hoses or tubes of the machine. As milk particles accumulate, various species of bacteria find nourishing living conditions therein so that they rapidly grow and multiply. With such bacteria present in the tubes it can not be prevented that they transgress into the milk during the milking process. Thus it is impossible to produce milk of low bacteria count with machines whose tubes have been infested by such bacteria.

To obviate present difficulties, it is a major object of this invention to provide a method of electrically cleaning and sterilizing milking machines, vaccine apparatus, medical instruments and the like by means of electrical discharge sparks caused to jump across a liquid spark gap submerged in the cleaning water or solution and passed through tubes and other elements to be sterilized, also immersed in the cleaning fluid, so that every portion of the surface of such elements is reached by the shock sound waves radiating from such liquid sparks.

It is another object of this invention to provide for the purpose in view a multiple-conductor cable, hereinafter called a discharge or shock sound cable, which carries at its free end a spark gap and is suitable to be inserted and pushed at slow speed through tubes, hoses and other elements to be cleaned and sterilized.

Another object of the invention is to provide for said shock sound cable a mouthpiece of plastic material which has a socket and a small hole in its face portion in which the electric spark discharges occur and from which shock sound radiation emanates.

A further object of the invention is to provide a cable mouthpiece that is molded to exact dimension without subsequent machining or finishing from plastic material of high rupture resistance, preferably from a material known as a polyaddition product of a diisocyanate with a polyester carrying free hydroxyl groups.

Another object of the invention is to provide for the cable mouthpiece of plastic material a protective sleeving of high mechanical deformation resistance, preferably consisting of high-grade steel and surrounding the mouthpiece with exception of its active face portion.

Another object of this invention is to provide a suitable power source and circuitry for properly energizing the shock sound cable as employed in the present sterilizing device, whereby a storage condenser is utilized in that it is charged up to the breakdown potential of a gaseous spark gap or a spark gap in open air, and upon breakdown of this spark gap the condenser discharges instantly into the shock sound cable to produce the liquid spark, and whereby the circuitry between power source proper and discharge cable can take various forms.

Still a further object of this invention is the provision of a suitable container for the cleaning and sterilizing procedure wherein the milk tubes and other milker elements to be cleaned are suspended in water or aqueous cleaning solution, and wherein cleaning and sterilizing by shock sound is effected in that one or several discharge cables are passed through all such tubes and elements in proper succession or simultaneously so that particularly all internal surfaces thereof are reached by effective germ-killing shock sound radiation.

Still another object of this invention is the provision of means for utilizing the present spark discharge method for sterilizing and conditioning drinking water, whereby the water is passed either continuously or in predetermined quantities through a shock sound cable arrangement.

Still another object of this invention is the provision of a shock sound cable in which a water-containing envelope of thin plastic material encloses completely the mouthpiece portion of the cable so that the discharges occur therein and shock sound radiation penetrates through the envelope into non-aqueous solutions which themselves have not the proper conductivity for liquid spark formation, thus making possible shock sound radiation into such liquids.

A still further object of the invention is to provide the shock sound cable with a conventional medical, ultrasonic treatment head and employ the cable for treatment of parts of the human body by elastic shock wave radiation preferably under application of a contact liquid or cream to facilitate sliding motion over the skin.

In order to achieve the objects in view, it is of primary importance to produce effective shock wave radiation in an aqueous solution and for this purpose it was found to be necessary to force condenser discharges through a small water capillary present in the small hole of the cable mouthpiece of detonation-resisting plastic material. At the instant of discharge the water in the capillary evaporates and causes a pressure wave whose power is equal to the power of a detonation of about $10^{-9}$ grams of dynamite, whereby at a distance of about one centimeter from the source a pressure of more than 1000 atmospheres can be measured. On account of their small energy these shock waves are harmless to the human being, but they are able to destroy at short distance all microorganisms. Intensive investigation and practical experience have shown that it is possible to clean milking machines and the like, also in bacteriological respect, with such shock waves of sufficient intensity. They remove milk and fat remnants completely from the inner walls of the milk tubes. Moreover, they effect complete destruction of germs, viruses and bacteria at normal cleaning water temperatures and without chemical additives.

To convey a still better understanding of the objects, principles, features and advantages of the present invention a detailed description of several preferred embodiments will now be given, whereby reference is made to the accompanying drawings, wherein—

Figure 1:
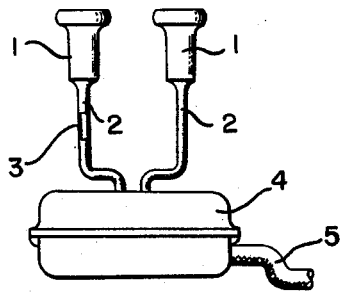
Fig. 1 is a diagrammatic view of a milking machine set to be cleaned and sterilized by the method and device as provided by this invention.
Figure 2A:
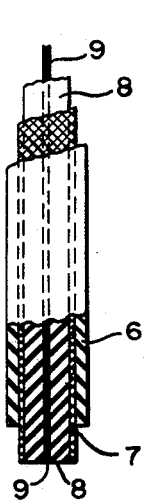
Figs. 2a, 2b and 2c show preferred embodiments of shock sound cables.

For general orientation there is shown in Fig. 1 a milking machine set having teat cups 1, milk tubes or hoses 2 of rubber or the like, which latter connect the teat cups to the milker head 4. The inner walls of the milk tubes, indicated at 3, are particularly susceptible to infestation by bacteria, since it cannot be prevented that surface ruptures and fine hairline cracks occur in these walls. In some milking machine designs there leads another rubber tube 5 from the milker head to the milk can or container. Such tube is another preferred hiding place for bacteria. For cleaning the milk tubes in accordance with the method as provided by this invention, there is used a shock wave source in the form of a cable as shown in a few preferred embodiments in Figs. 2a, 2b, and 2c. The cable itself is of similar construction in each of these embodiments and comprises the outer insulating jacket 6 which surrounds the outer, preferably tubular conductor 7, the insulation 8, which is preferably poly-ethylene, and the center conductor 9 which constitutes preferably high-grade steel. In the embodiment shown in Fig. 2a, a cable as just described serves directly as shock wave source in that it is cut flat at its free end and the flat face of center conductor 9 serves as one electrode. The outer insulating jacket 6 is cut back for a distance of about one to two centimeters so that a greater surface area of the outer conductor 7 is exposed to the liquid when the cable is immersed therein. When condenser discharges of sufficient potential are fed into such cable immersed in liquid, a liquid spark will jump across its face between center and outer conductor at each discharge impulse causing shock wave radiation therefrom.

Figure 2B:
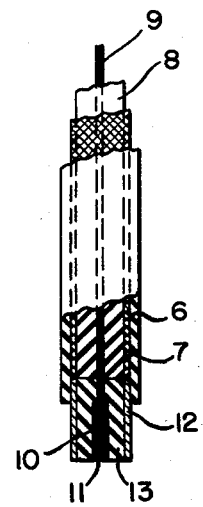

In the embodiment depicted in Fig. 2b, the cable is provided with a head portion or mouthpiece which includes the center electrode 10 in the form of a pin which is secured, preferably by welding, to the center conductor 9, and a sleeve 12, forming the outer electrode, secured to the outer conductor 7 preferably also by welding. To assure long life in spite of continuous spark action, both electrodes are preferably made of a high-grade steel. The mouthpiece proper 13 is formed by the insulation between electrodes 10 and 12, and is composed of detonation-resisting plastic material, preferably of the kind known under the trade name "Vulkollan" and being a poly-addition product of a diisocyanate with free hydroxyl groups carrying a polyester. In this construction, of course, the liquid spark gap is formed between pin electrode 10 and sleeve electrode 12 across the detonation-resisting plastic material 13.

Figure 2C:
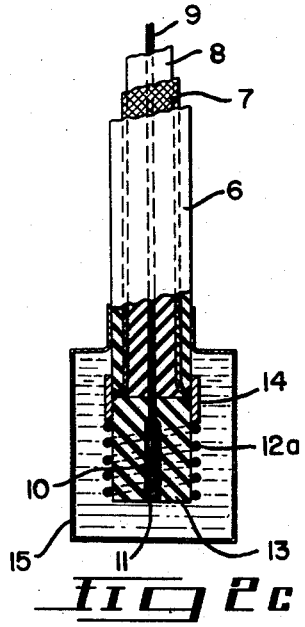

In the construction shown in Fig. 2c the sleeve 12 is replaced by a helically coiled wire 12a which in this case forms the outer electrode. The wire 12a is preferably also of high-grade steel and is conductively joined to outer conductor 7 by a tubular ring 14 of a suitable metal. The center electrode 10 is again a pin welded to conductor 9. The tubular outer conductor 7 of the cable is preferably in the form of braided or interwoven wires as customary in cable construction. The mouthpiece 13 of Vulkollan is molded to exact dimension in order to retain the smooth molded surfaces, and the small hole 11 in its face is the point at which the water capillary, as previously mentioned, evaporates when a discharge occurs. By experimenting with a mouthpiece construction as just described, and by connecting the positive terminal of the discharge source to the center conductor 9 with electrode 10, it has been found that, besides of shock wave radiation, considerable traces of ozone are produced at each spark over, which fact is of benefit in that ozone has a germ-killing effect and renders after-sterilization.

The discharge energy to which the cable of each of the types just described is to be subjected after immersion in an aqueous solution, evaporates the small liquid volume in the spark gap and breaks immediately thereafter as an electric sparkover through this not yet expanded vapor space, thereby it comes to a detonation-resembling sound development. In case the conductivity of the liquid is low, shock sound production is slow and the peak loudness moderate. With increasing conductivity of the liquid, shock sound production becomes faster and peak loudness greater.

To avoid confusion it should be remembered that shock sound waves differ from ultrasonic waves, because they produce only a positive pressure peak without any oscillatory characteristic. The sterilizing effects, it can be assumed, is caused by the nearly infinitely steep wave front which, when striking micro-organism, is able to destroy the latter completely.

The mouthpiece of the cable and the enclosing steel sleeve or helically coiled steel wire forming the outer electrode are subjected to considerable stress during operation by the continuous spark discharge detonations. Therefore, only plastic materials of extreme toughness can be used for mouthpiece construction, and it has been found that molding of such material to the proper shape including the center hole 11, without subsequent machining or finishing gives best wear resistance. The skin of the piece formed by molding is smooth and there are no internal stresses as usually set up by finishing.

For certain purposes it may be desirable to radiate shock sound waves into solutions that are not aqueous and do not have the proper conductivity for initiation of sparkovers therein. This, for instance, may be the case in serological studies and in vaccine production. To gain the benefit of shock wave action in such liquids of adverse conductivity, the mouthpiece portion of the shock sound cable can be enclosed by a water-containing envelope of thin plastic material as indicated at 15 in Fig. 2c. If so enclosed, the sparkovers occur within the envelope and shock sound radiates through the walls thereof. It has been found that plastic material film does not hinder shock wave radiation therethrough, and the outer surface of the envelope forms in such arrangement the source from which shock sound emanates. An envelope 15 of modified form has the additional advantage that it lends itself to therapeutic treatment of the human body by shock sound waves instead of the conventional ultrasonic therapy. For that purpose, the form of the plastic material envelope, which contains spark discharge water, and the end portion of the discharge cable must be shaped to take the form of a traditional ultrasonic transducer head for medical uses, and is preferably applied to the skin with sliding motion and assistance of contact liquid or cream. Shock sound therapy has the advantage of removing the danger of cavitation injuries as present in ultrasonic treatments.

The Figs. 3a, 3b, 3c and 3d disclose some preferred examples of power supply circuits for shock sound cable operation. All arrangements shown are insofar similar that a condenser 16, which is charged by some means to the breakdown potential of a spark gap 17, discharges suddenly upon breakdown of this spark gap into the discharge or shock sound cable with conductors 7, 9 and produces thereby at the mouthpiece of the cable liquid spark between the electrodes when the cable is immersed in an aqueous solution. The spark gap 17 is of the gaseous type, but need not be sealed or can be a spark gap in open air.

Figure 3A:
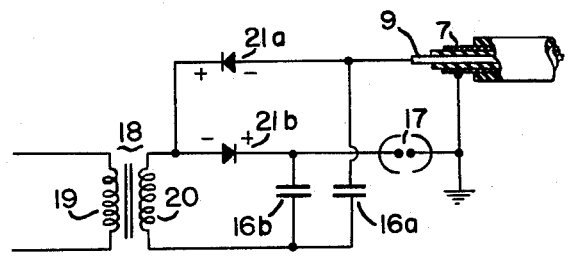
Figs. 3a, 3b, 3c and 3d show preferred embodiments of power supply circuits for energizing a shock sound cable.

The arrangement depicted in Fig. 3a is particularly suitable for discharges of considerable energy, and the condensers 16a and 16b are connected for charging by the well known voltage doubling circuit from transformer 18, having primary winding 19 and secondary winding 20, by way of rectifiers 21a and 21b. The discharge circuit is formed by the spark gap 17 and shock sound cable 7—9 having the liquid spark gap (not shown) at its free end. The primary 19 of transformer 18 has leads to be connected to a commercial alternating current power line. The secondary charging voltage of the transformer is in the range from 4 to 8 kilovolts.

Figure 3B:
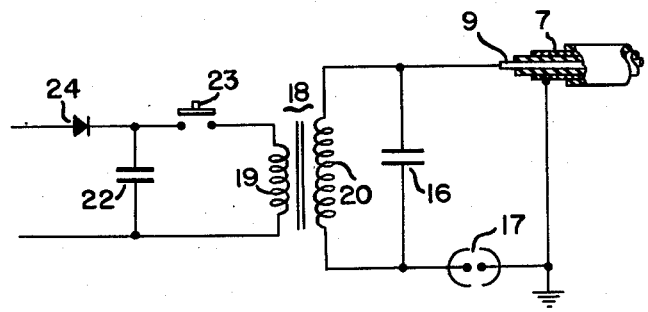

In the circuit shown in Fig. 3b, the high voltage, again in the range from 4 to 8 kilovolts, for charging the high-potential condenser 16, which is connected to the secondary 20 of transformer 18, is produced in that a low-potential condenser 22 is connected to the primary 19 of said transformer through a breaker contact 23, whereby at each contact breaking a high-potential voltage impulse is induced in the secondary 20 of transformer 18 which instantly charges condenser 16, which in turn at breakdown of gaseous gap 17 abruptly discharges into the shock sound cable. Low-potential condenser 22 is being kept charged from a commercial A.-C. power line through rectifier 24. In this system an increase in liquid spark energy is gained by the fact that at the instant of breakdown of the spark gap not only the energy stored in condenser 16, but in addition energy from the magnetic field of transformer 18 is released in the liquid spark. Such release of magnetic energy is impossible in the system of Fig. 3a. The arrangement of Fig. 3b is particularly suitable for yielding high ozone formation in the liquid spark discharge space.

Figure 3D:
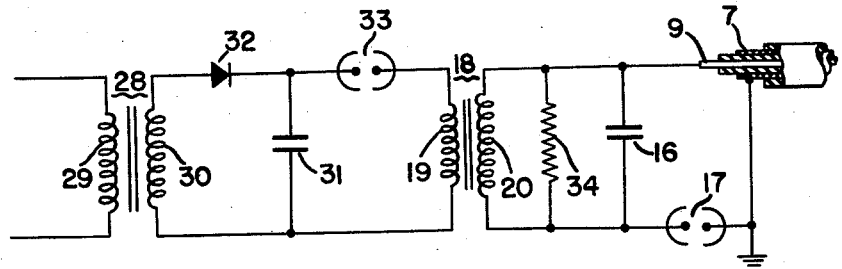
Figure 3C:
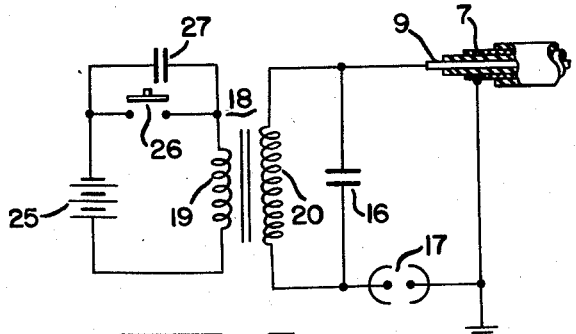

For setups of moderate size, a power supply circuit as shown in Fig. 3c may be sufficient. The transformer 18 is here actually a secondary-type induction coil which is fed from a battery 25 by way of an interrupter 26 with direct current in the same manner as in a motor car ignition system. The interrupter is bridged by a spark-suppression condenser 27 and the secondary 20 of the induction coil is connected across the high-potential storage condenser 16. At each break of the interrupter, a high voltage impulse is induced in the secondary 20 which charges condenser 16 up to breakdown of gaseous gap 17 and subsequently discharges into the cable 7—9 similarly as in the system of Fig. 3b.

Still another embodiment of a power supply system that has proved its value in reliable regularity of discharges at great energy conversion per spark is shown in Fig. 3d. Here two transformers are employed and the transformer from whose secondary the high potential condenser 16 is charged is again designated by reference numeral 18. Another transformer 28, whose primary 29 is fed from a commercial power line, has its secondary connected to a condenser 31 through a rectifier 32. Condenser 31 discharges at breakdown of spark gap 33 into the primary 19 of transformer 18. This discharge causes a high potential impulse in secondary 20, which in turn charges high potential condenser 16 to the breakdown point of gaseous spark gap 17, and finally initiates discharge of condenser 16 into cable 7—9, whereby condenser 16 and gap 17 take the same functions as the corresponding circuit elements in the other power supply circuits described. A damping resistor 34, having a resistance value suitable to suppress substantially circuit oscillation, is preferably connected across condenser 16. Owing to spark gap 33 in the primary circuit of transformer 18, satisfactory functioning of this power supply system can also be achieved without spark gap 17 and this spark gap is to be considered optional. The condenser 31 has from 3 to 5 times greater capacitance than condenser 16 so that sufficient energy, stored as magnetic energy, is additionally available at the instant of discharge from transformer 18. Such energy reserve improves the shock sound curve of the discharge. The repetition rate of discharges in this system can be controlled by the resistance value of the secondary 30 of transformer 28.

Figure 4:
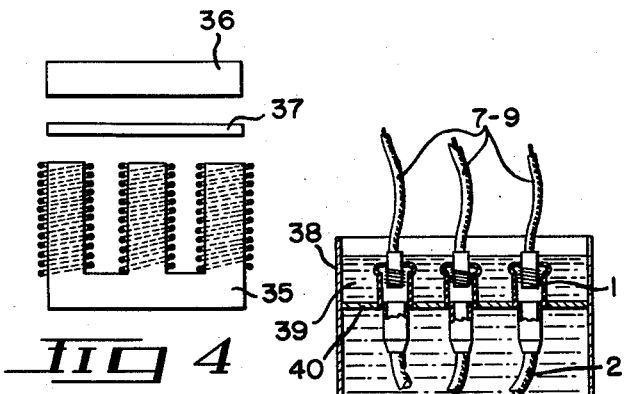
Fig. 4 is a schematic view of a transformer construction as preferably employed in a power supply circuit.

The transformers employed in the supply circuits just described can be constructed either without or with ferromagnetic cores. Fig. 4 is an exploded view of a transformer having a shell-type core. This transformer has the core 35 and a separable yoke 36. In such construction it is advantageous to insert a layer 37 of rubber or the like between core and yoke. Such layer suppresses the electrical and mechanical interactions of forces in the core and increases spark efficiency.

Figure 5:
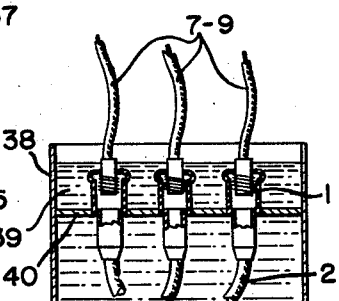
Fig. 5 is a diagrammatic view of milking machine sets as suspended for cleaning in a special container.
Figure 2D:
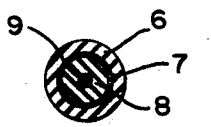
Fig. 2d is a cross-section through a shock sound cable taken above the mouthpiece and may be a cross-section through any one of the modifications shown in Figs. 2a, 2b, or 2c.

Fig. 5 finally shows the complete arrangement of a milking machine cleaning and sterilizing setup according to this invention. It is advisable to use a suitable container 38 which is filled with the cleaning solution 39 to a level that teat cups and milk tubes of a milker set can be completely submerged therein. The cleaning fluid may be plain water, but cleaning additives suitable for dairy use may be dissolved therein. A supporting frame 40 may preferably be provided in which the milking machine elements can be suspended to be readily accessible for the sterilizing and cleaning procedure. After this preparation, one or several shock sound cables as hereinbefore described are inserted and passed through teat cups, milk tubes and other elements at slow speed so that all portions of the inner surfaces and walls of such elements can be effectively reached by shock wave radiation emanating from the liquid sparks produced at the mouthpiece of the cable when the latter is energized by electric energy impulses. A repetition frequency of 5 to 15 sparks or shocks per second has been found most suitable. With such frequency the cleaning and sterilizing procedure of a whole milking machine set can be completed within a few minutes.

Practical tests and microscopic inspections have proved that not only lactic acid bacteria, but molds, viruses and other bacteria are destroyed up to complete sterilization particularly in the milk tubes. Even colonies hiding in hair cracks are killed because shock sound radiates equally well through water and rubber so that the steep shock front when striking the individual bacterium must kill it no matter whether it hides in a rubber crack, in a fat accumulation or in the cleaning solution.

Measurements with a sonde microphone revealed in one centimeter distance from the shock sound source pressures between 900 and 2,000 atmospheres, depending on the capacitance of condenser 16 and the charging voltage. From practical tests it appears that condensers having capacitances between 0.05 and 0.1 microfarad at charging voltages between 4 and 8 kilovolts are most suitable.

In order to force detonation-like condenser discharges through the liquid spark gap in the mouthpiece of the discharge cable, the pH of the solution in which the present method is performed must deviate slightly from 7.0. If exactly 7.0, the solution would be non-conducting and the shock sound cable would not be able to produce shock waves. But already a deviation of a few tenths from pH 7 is sufficient to create enough conductivity to assure shock wave generation. However, the more the pH deviates from 7 the stronger will be the detonation waves. Stronger detonation waves will have less duration on account of higher current conductivity, however the total energy of each sound shock is practically the same, and no apparent difference in the effect upon bacteria can be discerned. The sound of the detonations as heard by the ear varies, but the sterilizing effect is equally good no matter whether the pH of the cleaning solution is 6, 6.5, 7.5 or 8. This explains the fact that suitable cleansers or detergents can be added to the water without diminishing the detonation-like sterilizing sound shock action in any way.

The invention is not only useful for cleaning and sterilizing milking machines, but can be employed, as afore mentioned, also for sterilizing drinking water by sound shock waves and/or ozone, particularly in small drinking water conditioning setups. The system as provided by this invention can also be modified by using longer shock sound cables for cleaning pipe lines in dairies and other operations of the food industries. Moreover, the method has particular advantage for use in preparing medicines, for instance, vaccines by splitting of bacteria colonies at greater distance from the spark source, and for sterilizing in bacteriological laboratories and in the practice of the physician.

The shock sound cables can be modified and altered in their diameters to suit a particular application. For the milking machine application, the diameter of the steel sleeve 12, forming the outer electrode, is preferably 5 millimeters. For obtaining shock sound energy of higher intensity, the diameter can be increased. It is also possible to provide the cables with mouthpieces having non-circular cross-section, but the circular section has the advantage that it can be manufactured more economically.

While the foregoing specification and the drawings illustrate and describe preferred embodiments, it will be apparent to those familiar with this art that changes in construction of parts and in arrangement of elements can be made without departing from the spirit and scope of the invention as claimed.

What is claimed is:

1. An apparatus for shock sound wave treatment of contaminated surfaces of objects for decontaminating the latter, particularly the inner surfaces of tubular objects, comprising, in combination, an electrical pulse transmitting means consisting of an elongated flexible cable member including a central conductor and a surrounding tubular conductor insulated from said central conductor, and an insulating covering surrounding said tubular conductor, one end of said cable member being formed to established electrically conductive connections between the end of said central conductor and between the end of said tubular conductor, respectively, and a surrounding liquid medium when said one end of said cable member is immersed in such liquid medium so that an electrical pulse transmitted through said conductors will cause a spark-over through said medium in the liquid spark-gap formed between the points where said conductive connections between said conductors and said medium are established and consequently a shock sound wave in said liquid medium; and electric pulse generator means having output terminals respectively connected to said conductors at the other end of said cable member for injecting into said transmitting member pulses capable of causing said spark-over.

2. An apparatus as set forth in claim 1, wherein said one end of said cable member is formed with an end face exposing the end of said central conductor, while said insulating covering is recessed from said end face in such a manner that an annular portion of said tubular conductor is exposed.

3. An apparatus as set forth in claim 1, wherein said central conductor and said tubular conductor are made of high-grade steel.

4. An apparatus as set forth in claim 1, wherein said cable member is equipped at said one end thereof with a separate end piece of highly rupture-resistant non-conductive material attached thereto and having an end face, a central tubular duct extending outwardly to said end face and extending inwardly to the end of said central conductor, said end piece being further provided on its outside with a surrounding metallic member conductively connected to the end of said tubular conductor and having an annular exposed outer surface ending adjacent to said end face so that a spark gap is formed between said end of said central conductor and said surrounding metallic member across said end face of said end piece.

5. An apparatus as set forth in claim 4, wherein said surrounding metallic member mainly consists of a helically wound wire.

6. An apparatus as set forth in claim 4, wherein said end piece is made of a synthetic material being a polyaddition product of a diisocyanate with a polyester carrying free hydroxyl groups.

7. An apparatus as set forth in claim 1, wherein said one end of said cable member is equipped with enclosure means attached thereto and defining between its walls and the end portion of said cable member an enclosed space, said space being filled with an aqueous solution of predetermined conductivity, so that when said spark-over occurs within said aqueous solution and causes a shock sound wave in said solution, such shock sound wave is transmitted through said walls to a medium surrounding said enclosure means, said walls of said enclosure means being dimensioned to be capable of transmitting a shock sound wave from said solution to such surrounding medium.

8. An apparatus as set forth in claim 7, wherein said central conductor and said tubular conductor are made of high grade steel, wherein said cable member is equipped at said one end thereof with a separate end piece of highly rupture-resistant non-conductive material attached thereto and having an end face, a central tubular duct extending outwardly to said end face and extending inwardly to the end of said central conductor, said end piece being further provided on its outside with a surrounding metallic member conductively connected to the end of said tubular conductor and having an annular exposed outer surface ending adjacent to said end face so that a spark gap is formed between said end of said central conductor and said surrounding metallic member across said end face of said end piece, wherein said surrounding metallic member mainly consists of a helically wound wire, and wherein said end piece is made of a synthetic material being a polyaddition product of a diisocyanate with a polyester carrying free hydroxyl groups.

9. An apparatus as set forth in claim 1, wherein said electric pulse generator means comprises at least one high potential storage condenser, means for supplying charging energy to said condenser to charge it to a predetermined potential, a discharge circuit connected between said condenser and said output terminals and including a gaseous spark gap means, said predetermined charging potential of said condenser being higher than the breakdown potential of said gaseous spark gap means, whereby only after breakdown of said spark gap means an instantaneous discharge of said condenser is applied through said output terminals and through said conductors to said points at the ends thereof for causing said spark-over and thereby a shock sound wave in said liquid medium.

10. An apparatus as set forth in claim 9, including a first storage condenser, a charging circuit including an input transformer and a rectifier means in circuit with said first condenser for continuously supplying charging energy to said first condenser, an impulse transformer, a discharge circuit connected between said first condenser and the primary of said impulse transformer and including a gaseous spark gap means for causing periodical discharges of said first condenser into said primary winding, a second storage condenser connected in circuit with the secondary winding of said impulse transformer, and a discharge circuit connected between said second condenser and said output terminals and including second gaseous spark gap means, said impulse transformer and said second condenser being so dimensioned that the discharge potential of said second condenser is higher than the breakdown potential of said second gaseous spark gap means, whereby only after breakdown of said second spark gap means an instantaneous discharge of said condenser is applied through said output terminals and through said conductors to said points at the ends thereof for causing said spark-over and thereby a shock sound wave in said liquid medium.

11. Electrical pulse transmitting means for shock sound wave treatment of contaminated surfaces of objects for decontaminating the latter, particularly of inner surfaces of tubular objects, comprising, in combination, an elongated flexible cable member including a central conductor and a surrounding tubular conductor insulated from said central conductor, and an insulating covering surrounding said tubular conductor, one end of said cable member being formed to establish electrically conductive connections between the end of said central conductor and between the end of said tubular conductor, respectively, and a surrounding liquid medium when said one end of said cable member is immersed in such liquid medium so that an electrical pulse transmitted through said conductors will cause a spark-over through said medium in the liquid spark gap formed between the points where said conductive connections between said conductors and said medium are established, and consequently a shock sound wave in said liquid medium.

12. Electrical pulse transmitting means as set forth in claim 11, wherein said one end of said cable member is formed with an end face exposing the end of said central conductor, while said insulating covering is recessed from said end face in such a manner that an annular portion of said tubular conductor is exposed.

13. Electrical pulse transmitting means as set forth in claim 11, wherein said central conductor and said tubular conductor are made of high-grade steel.

14. Electrical pulse transmitting means as set forth in claim 11, wherein said cable member is equipped at said one end thereof with a separate end piece of highly rupture-resistant non-conductive material attached thereto and having an end face, a central tubular duct extending outwardly to said end face and extending inwardly to the end of said central conductor, said end piece being further provided on its outside with a surrounding metallic member conductively connected to the end of said tubular conductor and having an annular exposed outer surface ending adjacent to said end face so that a spark gap is formed between said end of said central conductor and said surrounding metallic member across said end face of said end piece.

15. Electrical pulse transmitting means as set forth in claim 14, wherein said surrounding metallic member mainly consists of a helically wound wire.

16. Electrical pulse transmitting means as set forth in claim 14, wherein said end piece is made of a synthetic material being a polyaddition product of a diisocyanate with a polyester carrying free hydroxyl groups.

17. Electrical pulse transmitting means as set forth in claim 11, wherein said one end of said cable member is equipped with enclosure means attached thereto and defining between its walls and the end portion of said cable member an enclosed space, said space being filled with an aqueous solution of predetermined conductivity, so that when said spark-over occurs within said aqueous solution and causes a shock sound wave in said solution, such shock sound wave is transmitted through said walls to a medium surrounding said enclosure means, said walls of said enclosure means being dimensioned to be capable of transmitting a shock sound wave from said solution to such surrounding medium.

18. Electrical pulse transmitting means as set forth in claim 17, wherein said central conductor and said tubular conductor are made of high grade steel, wherein said cable member is equipped at said one end thereof with a separate end piece of highly rupture-resistant non-conductive material attached thereto and having an end face, a central tubular duct extending outwardly to said end face and extending inwardly to the end of said central conductor, said end piece being further provided on its outside with a surrounding metallic member conductively connected to the end of said tubular conductor and having an annular exposed outer surface ending adjacent to said end face so that a spark gap is formed between said end of said central conductor and said surrounding metallic member across said end face of said end piece, wherein said surrounding metallic member mainly consists of a helically wound wire, and wherein said end piece is made of a synthetic material being a polyaddition product of a diisocyanate with a polyester carrying free hydroxyl groups.

References Cited in the file of this patent

UNITED STATES PATENTS

| | | |
|---|---|---|
| 1,376,180 | Wickersham | Apr. 26, 1921 |
| 2,301,315 | Opp | Nov. 10, 1942 |
| 2,456,909 | Brasch | Dec. 21, 1948 |
| 2,509,258 | Wing | May 30, 1950 |
| 2,544,477 | West | Mar. 6, 1951 |
| 2,559,227 | Rieber | July 3, 1951 |
| 2,578,673 | Cushman | Dec. 18, 1951 |
| 2,590,168 | Felici | Mar. 24, 1952 |
| 2,592,520 | Sackett et al. | Apr. 8, 1952 |
| 2,617,080 | Nims | Nov. 4, 1952 |